(12) United States Patent
Gerstel

(10) Patent No.: US 7,924,746 B2
(45) Date of Patent: *Apr. 12, 2011

(54) METHOD FOR SEPARATION OF PACKET NETWORK+OPTICAL MANAGEMENT DOMAINS

(75) Inventor: Ornan Gerstel, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 763 days.

This patent is subject to a terminal disclaimer.

(21) Appl. No.: 11/856,863

(22) Filed: Sep. 18, 2007

(65) Prior Publication Data

US 2008/0025722 A1     Jan. 31, 2008

Related U.S. Application Data

(63) Continuation-in-part of application No. 11/421,661, filed on Jun. 1, 2006.

(51) Int. Cl.
*H04L 12/28* (2006.01)
(52) U.S. Cl. .............................. 370/254; 398/30; 398/34

(58) Field of Classification Search .................. None
See application file for complete search history.

(56) References Cited

U.S. PATENT DOCUMENTS

| | | | |
|---|---|---|---|
| 6,088,434 A * | 7/2000 | Kasrai | 379/201.12 |
| 7,106,486 B1 * | 9/2006 | Nahapetian et al. | 359/238 |
| 2002/0030864 A1 * | 3/2002 | Chaudhuri et al. | 359/110 |
| 2002/0118414 A1 * | 8/2002 | Yuki et al. | 359/119 |
| 2003/0051195 A1 * | 3/2003 | Bosa et al. | 714/43 |
| 2003/0179716 A1 * | 9/2003 | Liu | 370/254 |
| 2003/0228093 A1 * | 12/2003 | Notani | 385/24 |
| 2007/0098006 A1 * | 5/2007 | Parry et al. | 370/437 |

* cited by examiner

*Primary Examiner* — Chirag G Shah
*Assistant Examiner* — Yong Zhou

(57) ABSTRACT

The present invention provides a mechanism and a method for indirectly controlling a packet handling device interface from an optical management system in an packet-optical network. A mechanism is provided for controlling a packet handling device, such as a router, interface from a management system indirectly, by using optical equipment as a proxy and communicating between the optical gear and router via a peer-to-peer signaling protocol. The present invention provides a management method that allows separate management systems for the optical layer and the packet network layer and a method for managing the network across the domains.

20 Claims, 8 Drawing Sheets

METHOD FOR SEPARATION OF PACKET NETWORK+OPTICAL MANAGEMENT DOMAINS

RELATED PATENT APPLICATIONS

The present application is a continuation-in-part of U.S. patent application Ser. No. 11/421,661, filed Jun. 1, 2006, which is incorporated herein by reference in its entirety.

BACKGROUND OF THE INVENTION

1. Field of Invention

The present invention relates to management of optical and packet network devices and, more particularly, to a method for maintaining both an optical and an packet management domain in a network architecture where optical management functions reside on packet network device.

2. Description of the Background Art

Traffic on packet networks, of which the Internet is the best-known example, continues to grow at astonishing rates so carriers have deployed high capacity optical networks that can handle the increased traffic volume. As such, optical networks are now widely utilized. Typically, the optical network is dedicated to long haul traffic and must interface at some point to packet, such as Internet Protocol (IP), networks, comprised of routers, switches and other infrastructure devices.

Most optical networking systems are now based on WDM (Wavelength Division Multiplexing) or DWDM (Dense Wavelength Division Multiplexing) technology both of which will be referred to herein as a WDM network unless specifically otherwise noted. In the past, a transponder has been used as the interface between the optical domain and the IP domain. As such, the transponder was the logical network device to be used for managing operations of the optical network. Indeed, the transponder has traditionally implemented many of the fault, configuration, accounting, performance and security (FCAPS) management functions that are necessary to manage the optical network.

With the transponder functioning as the demarcation point between the optical and packet networks, it was possible for a system administrator on the optical side to determine certain operational characteristics of the optical network. For example, at the transponder, bit error rate statistics are collected before traffic leaves the optical domain and enters the packet network domain. Because bit error rates cannot be detected in the optical domain, such statistics were collected when the transponder converted traffic from the optical domain to the packet network domain as well as in the reverse direction.

Since the optical network technology is considerably different from that employed in the packet network, it was logical to manage the optical domain separately from the packet network domain. Indeed, each domain has developed its own set of management tools and protocols and service providers (SPs) maintain separate administration staffs dedicated to managing each network.

While the separation of the optical domain from the packet network domain has resulted in efficient management of the two networks, cost reductions have led to the elimination of the transponder from the optical side of the network with the router now handling the traffic conversion from one domain to another. This architectural change is referred to herein as the packet-optical architecture or an packet-optical architecture network. Unfortunately, this architectural change in network topology has left management of the optical domain with an information void because many of the statistics previously gathered at the transponder are no longer available. Unfortunately, it is difficult to maintain the traditional separation of the management of the packet network layer from the optical layer since, with this architecture, it is necessary to manage certain optical aspects from the router interface by the optical layer management system.

Although it is possible to provide access to the router to manage each wavelength and to obtain the statistics necessary to manage the optical domain, it is difficult to cross management domains because of the existing mandate for two separate management systems. Furthermore, difficulties arise when the packet and optical networks are owned and controlled by different service providers where access to the necessary management information may be readily provided to the optical network administrators. Even within a single service provider, however, the administrators of the packet network domain may be reluctant to provide optical network administrators direct access to the router for security and other operational considerations. Without access to critical operational data, many service providers are reluctant to take advantage of the cost savings afforded by the new architectures that eliminate the transponder or that otherwise move the interface between domains such that it is inside the packet network domain.

Unfortunately, existing network management systems have not considered the issues that arise from integrated packet-optical networks insofar as respecting the operational boundaries between the optical and packet network management domains are concerned. What is needed is a system and method that allows carriers to adopt packet-optical networks without changing the organizational structure or the manner in which the organization operates.

DETAILED DESCRIPTION OF THE INVENTION

Figure 1:
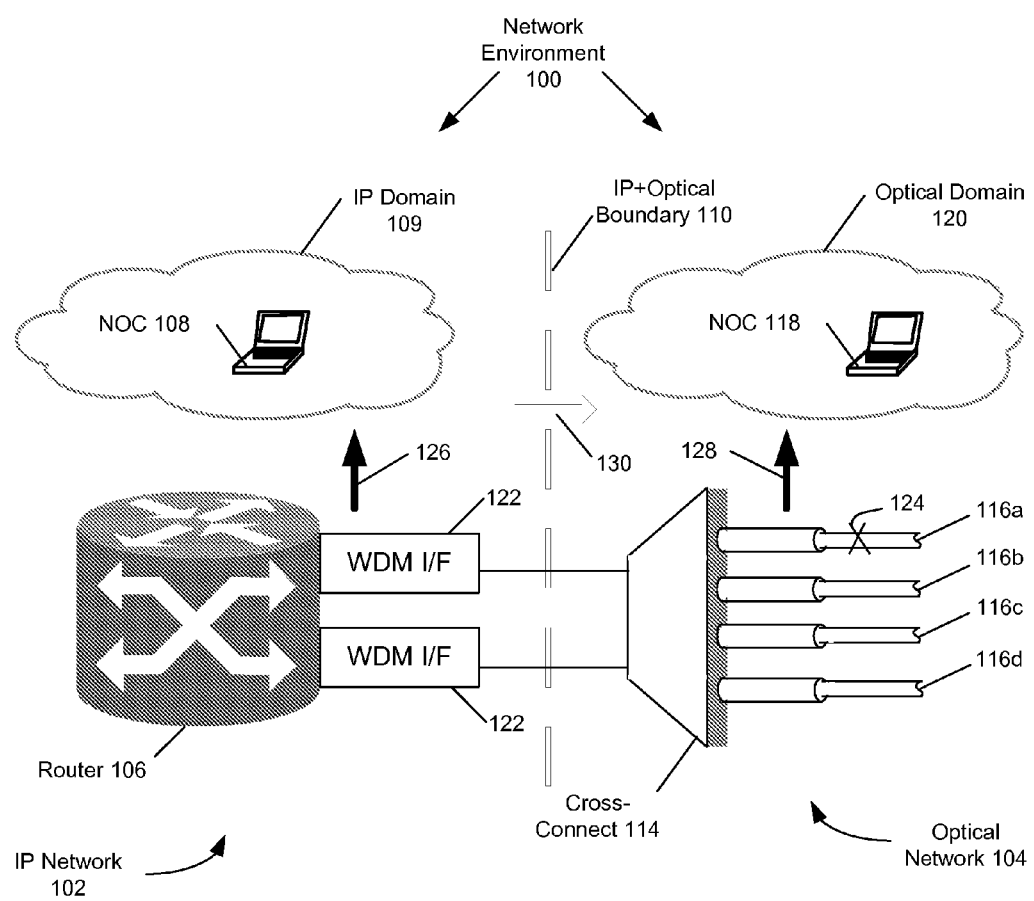
FIG. 1 illustrates a portion of a packet-optical architecture for a network in accordance with an embodiment of the present invention.

The present invention relates to management of a packet network-optical network and, more particularly, to a method for maintaining both an optical and a packet network management domain in a network architecture where at least one optical management function resides on a packet network network device.

In the following description of embodiments of the present invention, reference is made to the accompanying drawings that form a part hereof, and in which is shown by way of illustration specific embodiments in which the invention may be practiced. It is to be understood that other embodiments may be utilized and that changes may be made without departing from the scope of the present invention.

Further, in the following description of embodiments of the present invention, numerous specific details are provided to provide a complete understanding of the embodiments of the invention. One skilled in the relevant art will recognize, however, that the invention may be practiced without one or more of the specific details, or with other methods, components, etc. In other instances, well-known structures or operations are not shown or described in detail to avoid obscuring aspects of various embodiments of the invention. Wherever possible, the same reference numbers are used throughout in the drawings to refer to the same or like components.

Referring now to the drawings, particularly by their reference numbers, FIG. 1 illustrates a network environment 100 in accordance with an embodiment of the present invention. Environment 100 includes a packet network 102 and an optical network 104. Examples of network 102 include, but are not limited to, a Local Area Network (LAN), a Wide Area Network (WAN), a client-server network, a peer-to-peer network, the Internet and so forth. Examples of optical network 104 include, but are not limited to, a WDM network, a DWDM network and so forth.

The packet network 102 in FIG. 1 is described as an Internet Protocol (IP) network as an example and includes various network devices, of which representative core router 106 is illustrated. It will be appreciated that the example IP network 102 includes additional network devices, such as switches or other network infrastructure devices, which are not shown. A network management center (NOC) 108 resides on the IP network control plane, which is illustrated by network cloud 109, to manage IP network 102. NOC 108 executes software that manages the operational aspects of the router other than the per-packet analysis and delivery and responds to any system status/health anomalies.

Router 106 interfaces with optical network 104 and is responsible for converting traffic between the IP and optical domains. By way of example, router 106 may be a carrier class router, such as the commercially available Cisco CRS-1 core router. Of course, other packet handling devices, such as Ethernet switches or Provider Bridge Transport (PBT) devices, may be in place of a router.

NOC 108 comprises a system of equipment used in monitoring, controlling, and managing the IP network 102 including the network infrastructure devices such as router 106. NOC 108 may use various software applications but are typically managed using the command line interface, often referred to as CLI, and XML (eXtensible Markup Language) based applications.

WDM optical network 104 is illustrated as including an optical network element (ONE), such as optical wavelength cross-connect 114. Wavelength cross-connect 114 is illustrated having four optical fiber inputs 116a-116d that carry traffic in the form of modulated optical signals. It will be appreciated that wavelength cross-connect 114 may have four, eight, sixteen or some other number of optical fiber inputs. Preferably, wavelength cross-connect 114 includes the lasers and photonic detectors in WDM interface 122 that can accept and generate optical signals.

Optical network further comprises optical interface components such as photonic switches, multiplexers, demultiplexers and circuitry for mapping data streams into the optical layer as well as for demapping data streams. Optical network 104 includes a plurality of ONEs that are not illustrated herein. Optical network 104 further includes an optical network operations center (NOC) 118 that resides on an optical network control plane 120 to manage optical network 104. Optical network control plane 120 is represented by a network cloud. Typically, NOC 118 uses Transaction Language One as the telecommunications management protocol widely used to manage optical Synchronous Digital Hierarchy (SDH), Synchronous Optical Network (SONET) and optical transport networks as well as other means to provide rapid identification of services impacted by network outages.

It will be understood by those skilled in the art that the network shown in FIG. 1 (and the other figures) is only intended to depict a small section of a representative IP-optical network employing the present invention, and is not drawn to scale. The size, relationship and devices used for the network devices shown in these figures may be altered significantly from that shown without departing from the present teachings.

Router 106, representative of packet handling devices, includes WDM interfaces 122 that feed directly into the optical layer without mediation by transponders and is a key component for merging the IP domain with the optical domain. One skilled in the art will understand that such interfaces are presently available in state of the art IP-optical networks. Thus, in this IP-optical network, optical signals that cross the IP-optical boundary 110 are directed to WDM interfaces 122 where the optical signals are converted to IP traffic. Similarly, IP traffic destined for the optical network is converted to optical traffic by WDM interface 122. WDM interfaces 122 may include a tunable laser and is directly integrated with router 106. Effectively, WDM interface 122 collapses network environment 100 by removing a layer of SONET equipment, such as the transponder from the optical domain and short range optical interface cards from the IP domain, to save costs and to link IP traffic directly with SONET operations.

NOC 118 monitors operational conditions of the optical layer and includes a plurality of sensors and systems that enable administrators of optical network 104 to monitor and correct problems when errors are detected. As is well known in the art, typically when an error occurs in the optical network, an alarm is generated that is transferred to the optical control plane 120 and delivered to NOC 118. While the IP-optical architecture provides significant cost savings by removing transponders from network 100, it blurs the demarcation between the IP domain and the optical domain. Many of the fault, configuration, accounting, performance and security (FCAPS) management functions that traditionally reside on a transponder are now moved to the WDM interface on the router, that is, across the boundary into the IP domain.

To illustrate the problem for administrators of the optical network, consider that bit error rate statistics can no longer be collected in the optical layer without a component that performs the necessary electrical processing on the traffic. Rather, in the IP-optical network, only the WDM interface 122 on the router can collect such statistics for the optical traffic.

Because of the optical aspects of the router interface, only NOC 108 would be aware of a soft error type of problem, indicated at 124, occurring in the optical domain. Soft errors are errors other than loss of light or other forward defect indicators (FDI) in the optical domain. Since the router 106 may still be receiving bits, any alarms generated by the router as a result of the problem 124 could be assigned a low priority. Without the present invention, NOC 118 would not have visibiltiy of the error and would be unable to proactively resolve the problem. In an idealized network environment, the IP network administrators would simply provide NOC 118 full access to the management functions of the router 106 but this openness makes it difficult to keep the management of the router separate from the management of the optical layer. The problem is further exacerbated by organizational boundaries within most service providers that require, at least as a first management step, that the two management domains remain separate and each retain the same black box behavior as in traditional architecture. With the present invention, the error condition is reported to both management center 108, as indicated at 126, and NOC 118, as indicated at 128. This allows the optical layer to report the alarm to NOC 118. Furthermore, when router 106 detects a problem in the IP domain, it sends a backward defect indicator to the adjacent node, that is, the wavelength cross-connect 114 as indicated at 130.

Figure 2:
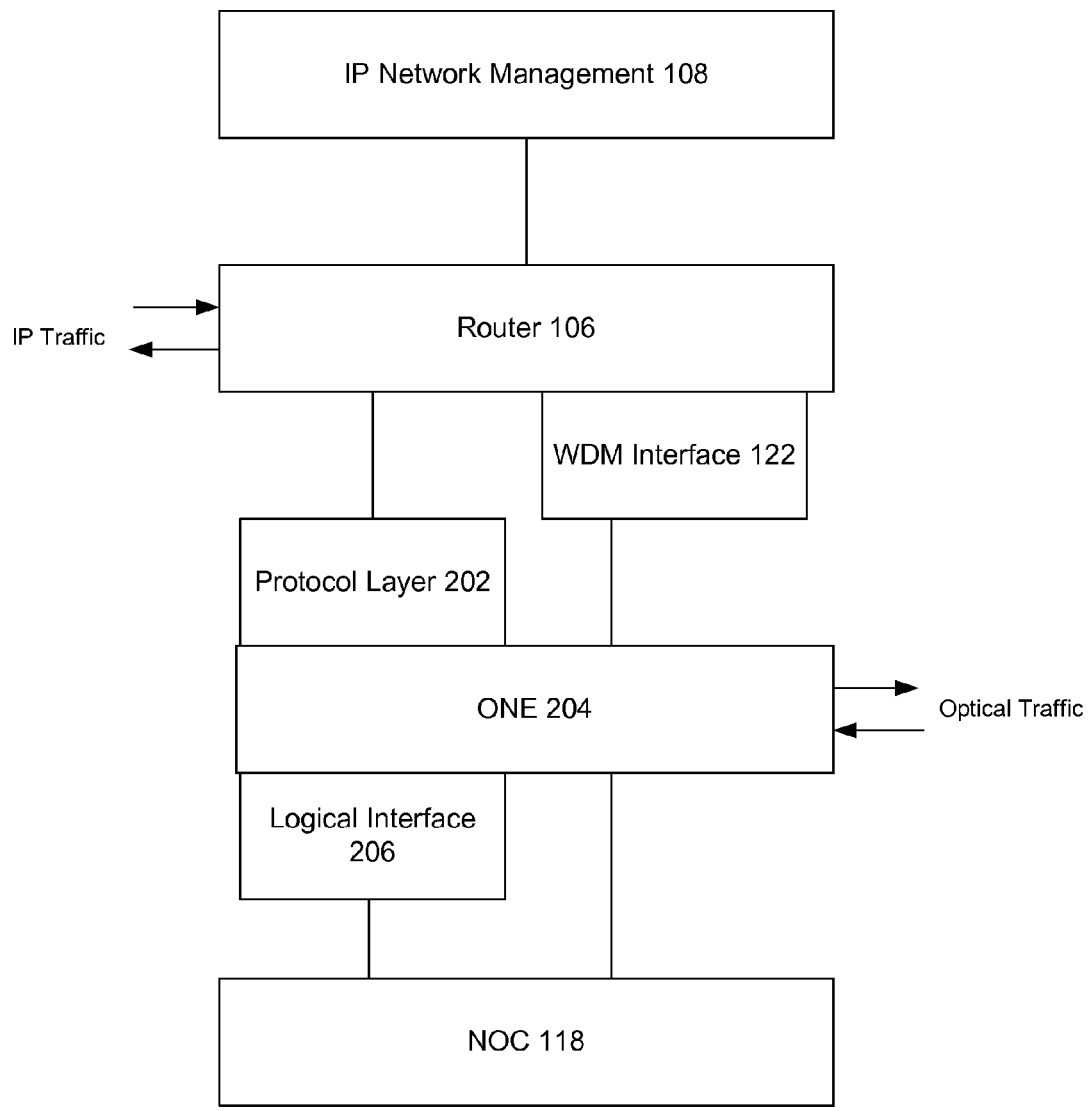
FIG. 2 illustrates the optical management interfaces for a packet-optical network environment in accordance with an embodiment of the present invention.

Refer now to FIG. 2, which is a generalized illustration of the optical management interfaces for an IP-optical network environment. Rather than manage the router interface directly from the optical layer management system, one embodiment of the present invention provides a system and a method for accessing the router from the optical domain to detect error conditions, including soft errors such as bit error rate, for each wavelength. Accordingly, embodiments of the present invention provide an IP-optical architecture that separates the management system of the optical layer from that of the router layer that avoids the problems of the integration of two different management languages, techniques and administrators.

The invention is based, in part, on a protocol layer 202 between the router 106 and a ONE 204 that allows NOC 118 to collect the transmission related data from the router interface, as well as set desired parameters on the router interface. ONE 204 may be any optical network edge device, such as a multiplexer or a photonic switch.

In one embodiment, the protocol layer 202 is an extension of the existing Link Management Protocol or LMP, which preferably is based on the LMP-WDM IETF standard. LMP is currently used to coordinate error detection and is primarily used to indicate across a domain boundary that a problem has been detected in one domain to the management center in the other domain. To illustrate, with the existing LMP, if the router detects a problem with its operation, an LMP message would be sent to the NOC 118 merely to provide notification of the current status of the IP network. Or, if the NOC 118 detected a problem in the optical domain, then an LMP message would be sent to the management center 108 to provide notification of the current status of the optical network. In neither case, would the prior art LMP message enable a network administrator on the optical side to reconfigure the router in response to a detected problem. Advantageously, the present invention provides the mechanism and the method for responding to a problem in the optical domain by changing or correcting router configuration. The protocol layer 202 may also be based on network management protocols, such as XML (eXtensible Markup Language), SNMP (Simple Network Management Protocol), CLI (Command Line Interface) or TL/1 (Transaction Language 1).

Alternatively, the protocol, in accordance with the present invention, may be implemented as a separate protocol, such as a peer-to-peer signaling protocol. Peer-to-peer signaling protocol is suitable where the IP network and the optical network are operated by a single entity and subject to a unified management scheme.

In addition to the defined protocol layer 202, the present invention also provides a logical interface 206 as part of the management model of the ONE. The logical interface, which represents the optical characteristics of the router interface, acts as a proxy for the physical router interface, but in the optical domain. Therefore, all optical alarms and performance data that are retrieved by the NOC 118, as well as provisioning of the router interface from the NOC, are performed on logical interface 206.

When NOC 118 sends a command, which is typically a TL1 based command, to the ONE 204 relating to logical interface 206, ONE 204 translates the command to the protocol between ONE 204 and router 106 and indirectly provisions or retrieves management data from the router. Alternatively, ONE 204 may retrieve the data from the router 106 at an earlier time and store the data in a local database for retrieval by NOC 118. Such retrieval may, for example, be initiated by a periodic polling request.

When router 106 detects a problem in the IP domain, then router 106 sends a backward defect indicator to the adjacent ONE. This allows the optical layer to report the alarm to NOC 118. The combination of the protocol layer and the logical interface function as a virtual transponder. This combination provides NOC 118 with alarm correlation with router 106, tuning wavelengths, pushing or pulling statistical data and general performance monitoring. Because the NOC 118 still retains control of wavelength management as well as soft errors, network operations in the IP-optical network environment is enhanced.

Figure 3:
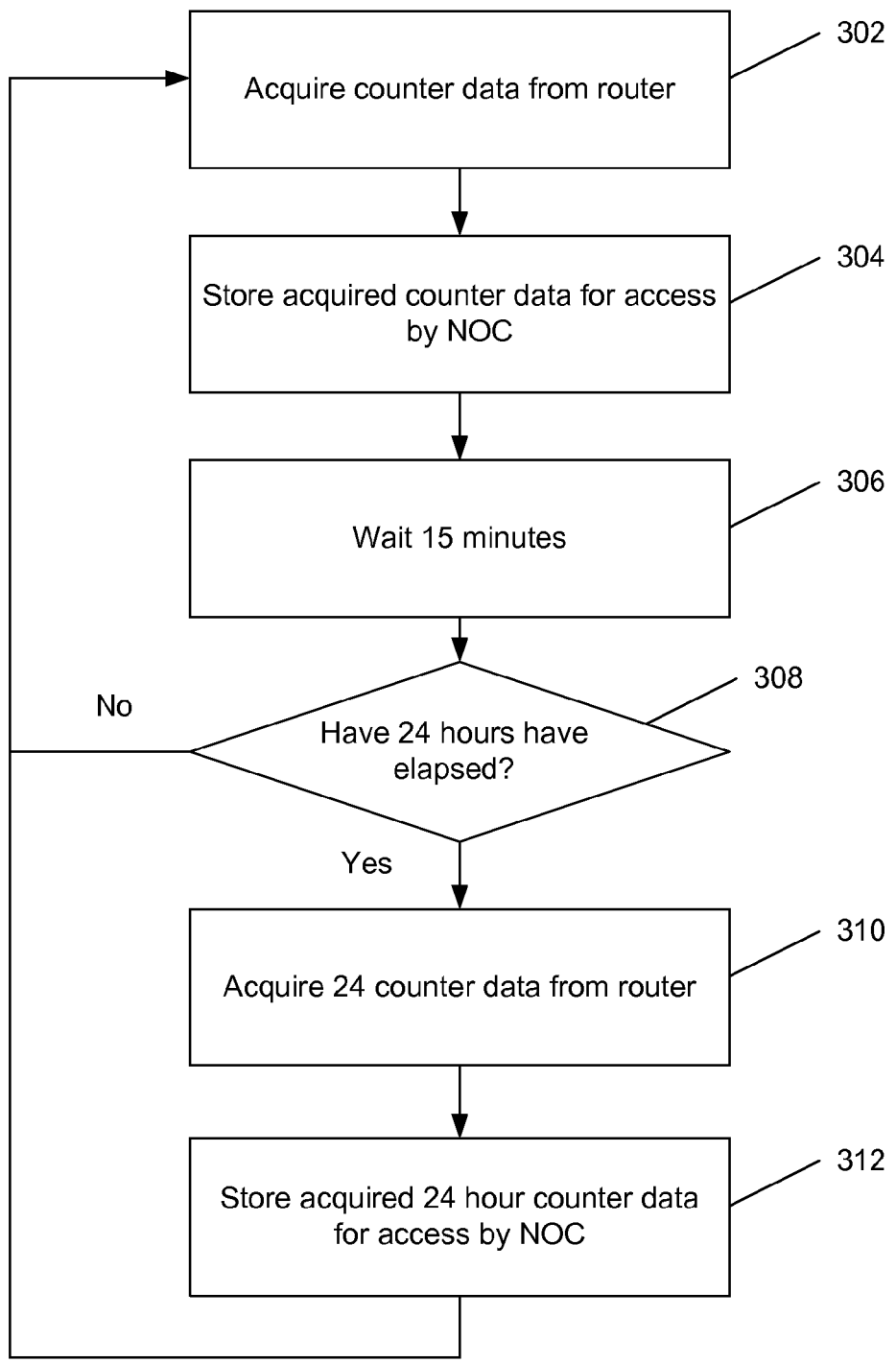
FIG. 3 is a flow diagram illustrating a method for managing an IP-optical network to acquire performance data for the optical network in accordance with an embodiment of the present invention.

FIG. 3 illustrates an embodiment of the present invention for managing an IP-optical network to acquire performance data that may not be acquired in the IP domain but which is required by telecom standards in the optical domain. Specifically, telecom standards call for storage and retrieval of 15 minutes counters and 24 hour counters that are not required in the IP domain. Thus, on a periodic basis, ONE 204 initiates a request to receive counter values for a 15 minute counter as indicated at 302. Since retention of counter values is not typically supported by most routers, the information is stored in a database associated with ONE 204 for use by NOC 118 as indicated at 304. Such requests are made every 15 minutes as indicated at 306. Similarly, the counter value for a 24 hour counter is also periodically made as indicated at 308-312.

Figure 4:
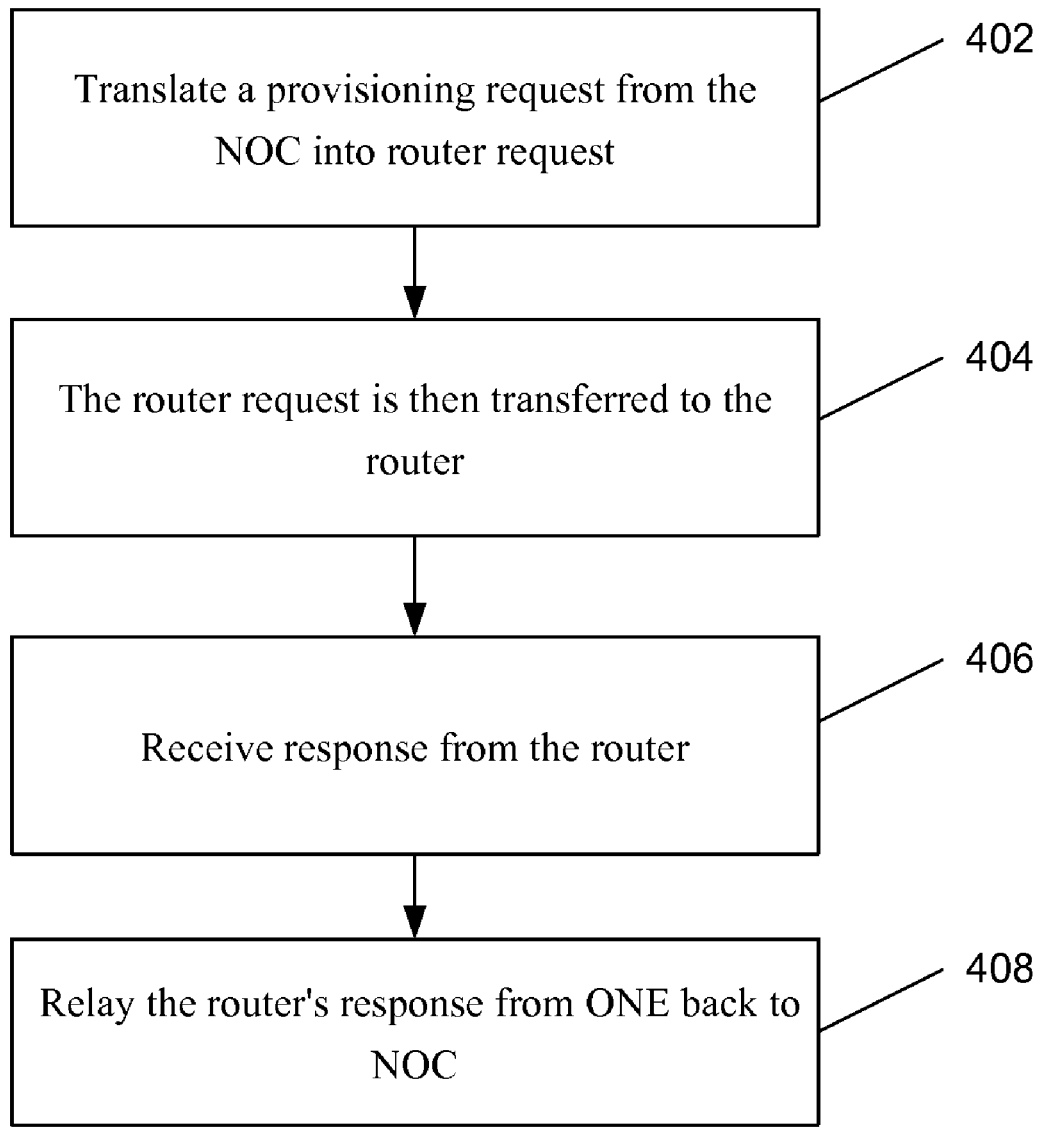
FIG. 4 is a flow diagram illustrating a method for managing an IP-optical network to configure the router interface from the optical domain in accordance with an embodiment of the present invention.

FIG. 4 illustrates an embodiment of the present invention for managing an IP-optical network to configure the router interface. In order to configure router 106, several parameters must be configured on WDM interface 122. Examples include the wavelength and the frame format (SONET, 10GE, or G.709), as well as thresholds for alarms that are required to properly manage the optical domain. In this embodiment, the ONE translates a provisioning request from the NOC 118 into a router request as indicated at 402. This request is a LMP-like request that is based on an extension to the existing LMP protocol in one embodiment. In another embodiment, a proprietary protocol is defined to implement the transfer of information between the router and the ONE. In another embodiment, an existing management interface (based on XML, SNMP, CLI or TL/1) is extended to implement the transfer of information. The router request is then transferred to the router as indicated at 404. The router response is received as indicated at 406 and ONE relays the router's response back to NOC 118 as indicated at 408.

Figure 5:
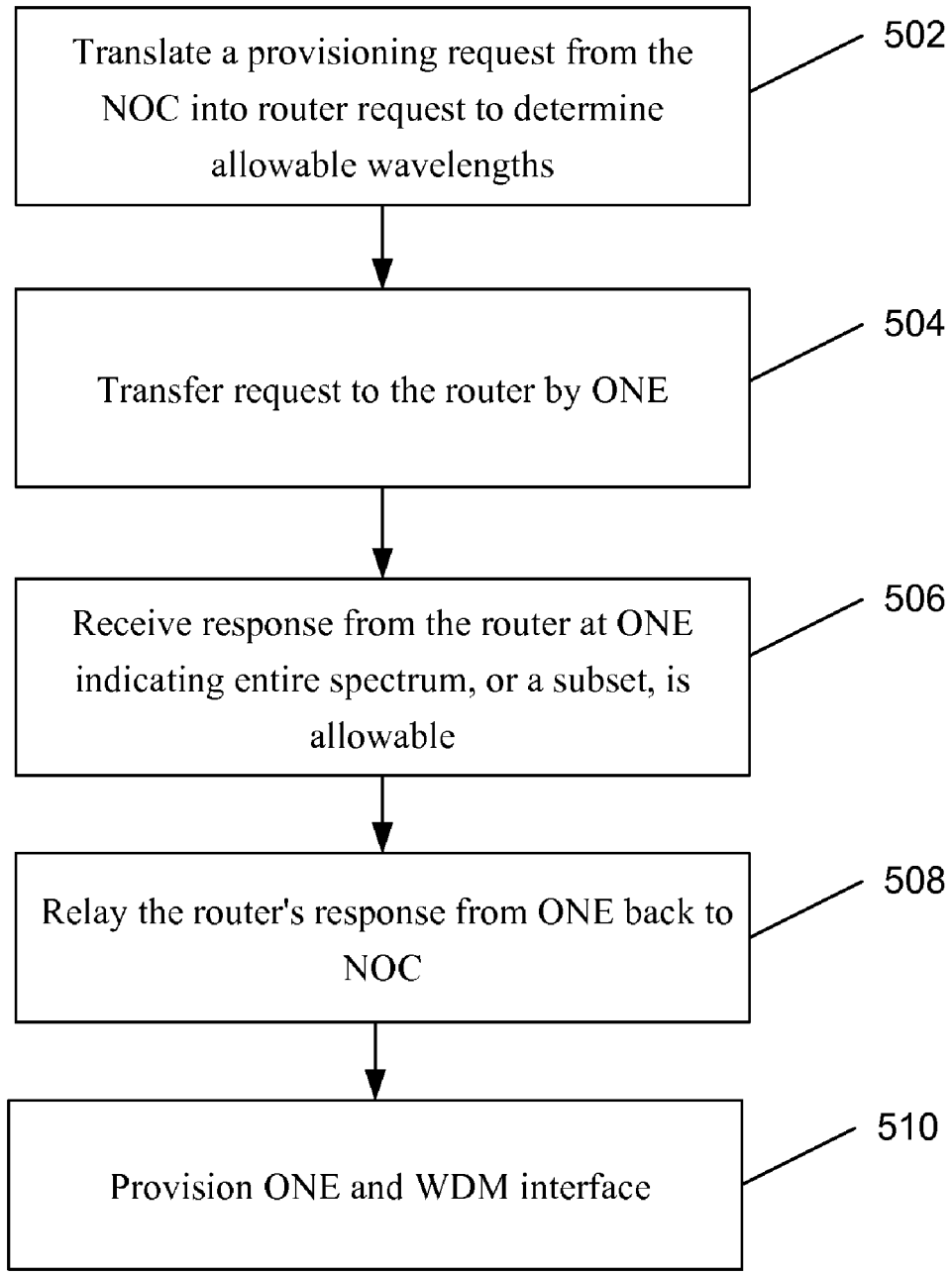
FIG. 5 is a flow diagram illustrating another method for managing an IP-optical network to configure the router interface from the optical domain in accordance with an embodiment of the present invention.

FIG. 5 illustrates an embodiment of the present invention for managing an IP-optical network to configure the router interface. In this embodiment, a parameter negotiation mechanism is used to provision values on the router. This approach avoids attempting to force a value on the router at the WDM interface, which may not be desirable if the router management system also wants to determine various values or otherwise apply certain restrictions. To illustrate, at 502, NOC 118 determines if the router administrator will allow any wavelength to be provisioned by sending a request to router 106 through ONE 204. If the WDM interface 122 is provisioned such that it defines the allowable wavelength range as the entire spectrum, this message would be passed to NOC 118 through the ONE as indicated at 504-508. The response, in this example, enables NOC 118 to set the wavelength in accordance with the needs of the optical domain as indicated at 510. Alternatively, if the router administrator wishes to fix the wavelength, they would only allow one value. Alternatively, the router could allow for a subset of allowable values to be returned to NOC 118. In either of these alternative events, NOC 118 would accept the allowable values subject to the ability to re-provision the optical domain. If NOC 118 is unable to re-provision, alarms are generated and the problem is escalated to an administrator.

Figure 6:
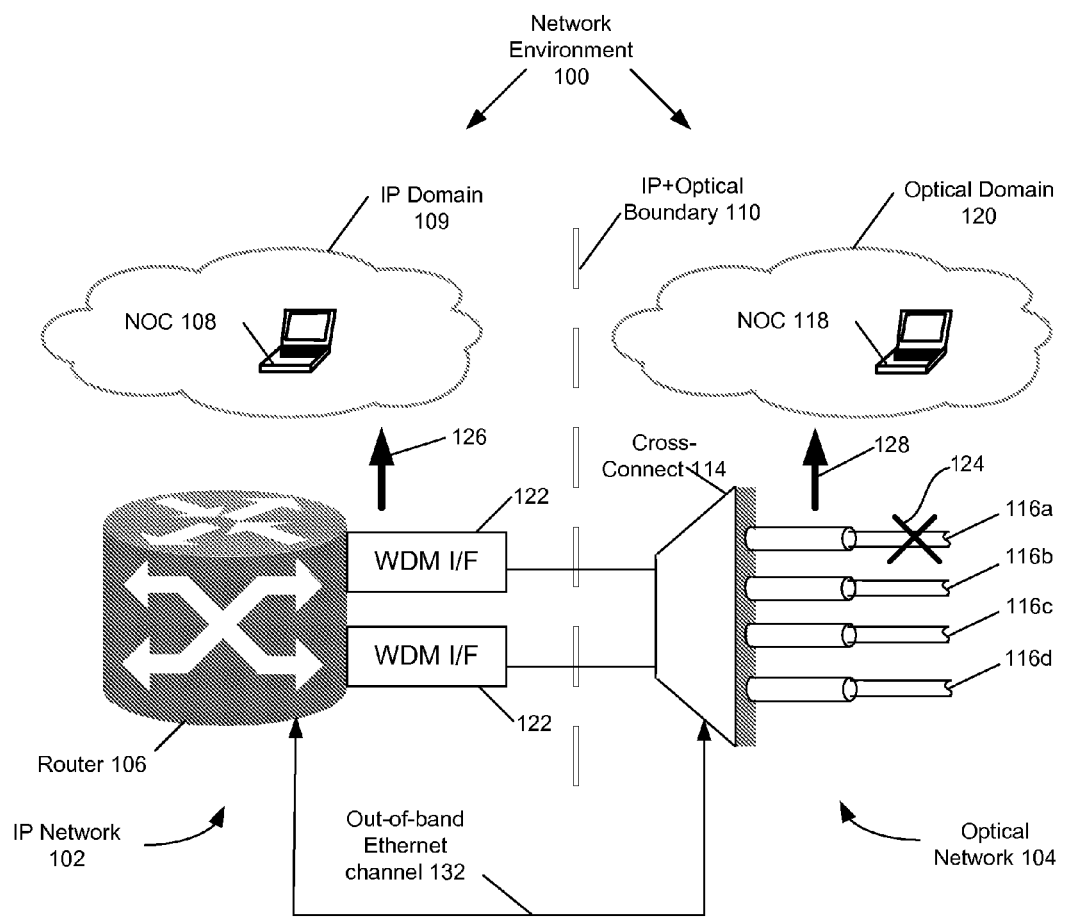
FIG. 6 illustrates a portion of an IP-optical architecture for a network in accordance with an embodiment of the present invention.

FIG. 6 illustrates another embodiment of the present invention that includes an out-of-band signaling interface 132 between router 106 and wavelength cross-connect 114. LMP is an out-of-band service since the optical domain has no visibility into in-band data. Ideally, a dedicated Ethernet connection 132 between the main controllers of the router and the ONE. However, since there may be several ONE systems and possibly several routers all interconnected to each other at the same site, Ethernet connection 132 may include an Ethernet switch (not illustrated).

Ethernet connection 132 also guarantees the performance of the signaling channel if, as in the preferred embodiment, the connection is separate from the management interface because the management interface may be overloaded, during certain conditions such as a software download. Performance guarantees are crucial, especially where optical restoration is implemented, because the speed of restoration depends on the speed of out-of-band signaling.

The mechanism and protocol of the present invention is not limited to fault reporting. Rather, in a preferred embodiment, it is also used for performance monitoring of the optical domain. Thus, when the NOC needs to collect and display performance counters, such as the number of error seconds in each 15 minute time frame, the importance of performance monitoring comes from service providers that require the optical network administrators to continue to operate the transponder functions (FCAPS), but with the transponder functions transferred to the DWDM interface on the router in the IP domain.

Figure 7:
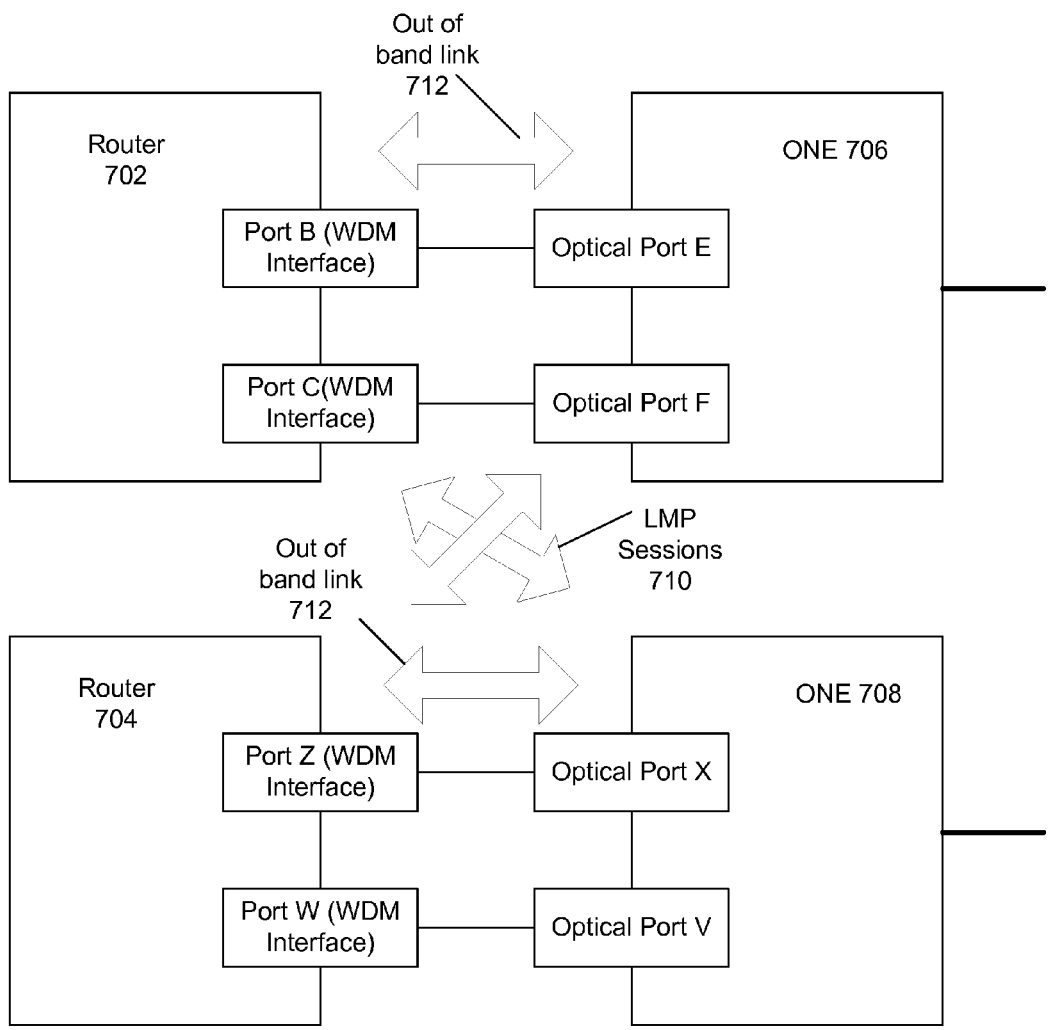
FIG. 7 is a block diagram that illustrates configuration management by auto-negotiations in accordance with an embodiment of the present invention.

FIG. 7 is a block diagram that illustrates configuration management by auto-negotiations in accordance with an embodiment of the present invention. The ability of the two network edge devices (NEs), one on the IP side, such as routers 702 and 704, and one on the optical side of the boundary, such as ONE 706 and 708, to automatically agree on the relevant parameters without manual configuration of all NEs is not a simple task. The present invention therefore provides a method for provisioning the optical interface by the optical group using negotiated techniques, as opposed to explicit provisioning of the physical layer interface (PLI) by NOC 118.

In one embodiment, the negotiated parameters include:

signal type (10GE or OC192 PLI), which is a value determined by the PLI card type;

signal format (native, G.709, G.709 with EFEC), which is a value determined by either the PLI or from the optical domain;

the wavelength to be transmitted which is determined by NOC 118 which can add/drop ports, support fixed wavelengths, so that when a PLI is connected to a particular port on ONE its wavelength is well defined;

trace ID at the G.709 frame which can be set by an operation on either side;

threshold crossing alarm (TCA) which is the threshold that is set by an operation on either side of the boundary 110.

If NOC 118 sets the "virtual interface" that represents a router WDM port on ONE, and if the IP management system leaves these parameters undefined, then the values from the optical side will be accepted. On the other hand, if the IP management system 108 wishes to explicitly set some values and exclude other values, then the values set in the IP domain will not be overridden by what the NOC has provisioned. This auto-negotiation mechanism enables the parameters that the optical system can provision on the router interface and then enables the optical domain to automatically provision the interface.

Beyond the basic operations of the WDM interface on the router, it may be desirable to automatically detect the mapping between that interfaces and the optical layer interface. Unlike the functions described above, this function is not mandatory because it is always possible to manually configure the mapping, however it is certainly a desirable feature as it prevents human error and is a labor saving function.

In order to discover how two interfaces are connected, it is necessary to send an in-band code over these interfaces; however, optical domain does not have visibility into the signals it carries as each ONE 706 and 708 are pure optical boxes with the conversion to bits occurring at the router's ports. The optical domain does have a photodiode per interface for fault management purposes that allows it to detect a very slow code created by turning the laser on the router's WDM interface ports on and off.

Two implementation details will determine the frequency of this on/off sequence:

the polling speed for the photodiode (when the polling is done in software, the polling speed is on the order of about 100-200 ms); and the speed at which the laser in the WDM interface can be turned on and off.

Because the optical domain does not own the DWDM sources, it can not generate any type of autodiscovery sequence. Accordingly, the autodiscovery function is unidirectional with the optical domain discovering the incoming interfaces from the router and no active discovery is done in the opposite direction for the interfaces from ONEs 706 and 708 into the routers 702 and 704. The cabling is preferably the same in both directions.

One skilled in the art will appreciate that determining when a particular interface should start the autodiscovery sequence and when should it stop is a difficult issue to resolve and is preferably an engineering parameter to be decided for each particular application. However, the present invention provides that the re-start sequence that occurs after a disconnection between the two boxes and after the optical domain discovers the autodiscovery sequence from the router, it needs to report back (over LMP) the recognized code from the interface over which the code was received. This establishes the mapping of the interfaces and needs to be reported back from the router to NOC 118 via the ONE again over LMP 710.

Figure 8:
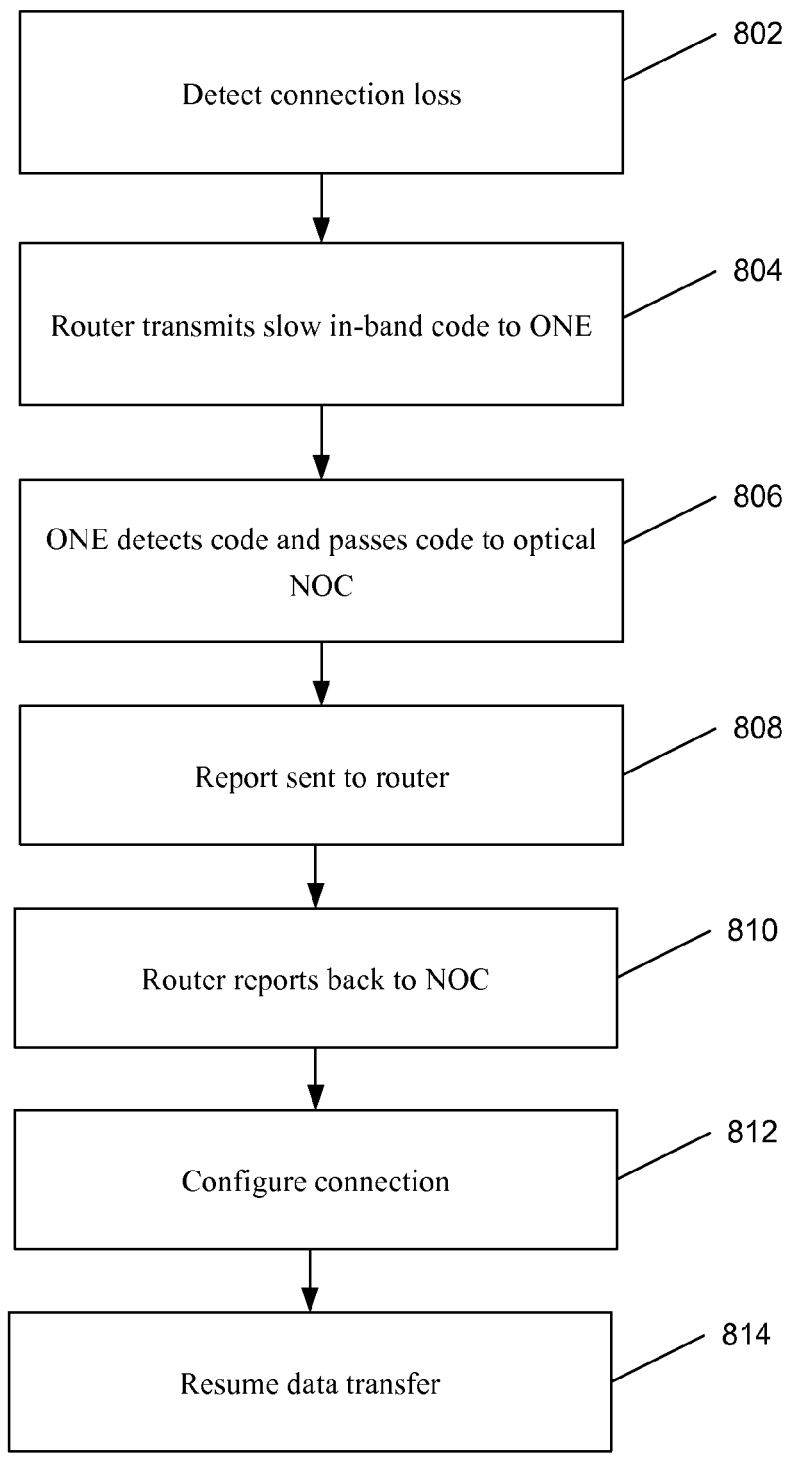
FIG. 8 illustrates one method for automatically detecting the mapping between the router interfaces and the optical layer interface in accordance with an embodiment of the present invention.

FIG. 8 illustrates one method for automatically detecting the mapping between the router interfaces and the optical layer interface in accordance with an embodiment of the present invention. Advantageously, automatic mapping detection prevents human error and is not dependent on operator intervention and that means that network operation can be quickly restored in the event of a temporary disconnect between the network elements.

To discover how two interfaces, one in the IP domain and one in the optical domain, are connected, the present invention initiates a procedure for mapping the connection. Typically, the mapping occurs after a detected connection loss and the system is attempting to re-establish connection as indicated at 802. Because NOC 118 does not have visibility into the optical signals carried on optical network 104, a photodiode at each interfaces (not illustrated) is also useful for both auto mapping and fault management purposes.

At 804, router 106 initially begins to transmit a very slow in-band code by turning the laser at WDM interface 122 on and off. At 806, the code is detected by the photodiode by polling and passed to NOC 118. Since NOC 118 does not own the WDM interface 122, it can not generate any type of autodiscovery sequence, therefore the autodiscovery sequence is unidirectional with NOC 118 discovering the incoming interfaces from router 106. Note that no active discovery occurs in the opposite direction for the interfaces from NOC 118 into router 106.

As indicated at 808, when NOC 118 discovers the autodiscovery sequence, it reports to router 106 the code it detected at the interface, preferably with a message over LMP. In response to the message, router 106 reports back to NOC 118 with a message that is again preferably over LMP as indicated at 810. As indicated 812, the message from the NOC 118 to router 106 and the message from router 106 to NOC 118 initiate certain action that each side needs to take to begin normal operations. At 814, data is transferred between the IP-optical domain.

Therefore, while the description above provides a full and complete disclosure of the preferred embodiments of the present invention, various modifications, alternate constructions, and equivalents will be obvious to those with skill in the art. Thus, the scope of the present invention is limited solely by the metes and bounds of the appended claims.

The invention claimed is:

1. An apparatus comprising:
a first interface that is configured to be coupled to an optical control plane of an optical network operations center (NOC) in an optical network having an optical domain managed by the optical NOC, wherein the first interface resides in the optical domain and facilitates communication to and from the optical NOC;
a second interface that is configured to be optically coupled to a Wavelength Division Multiplexing (WDM) optical interface of a packet network device that resides in a packet network domain of a packet network, wherein the packet network device is normally managed by a packet network NOC via a packet network control plane and is configured to convert packet network traffic destined for the optical domain into optical traffic, and to convert optical traffic destined for the packet network domain into packet network traffic via optical signals that cross a packet network-optical network boundary that separates control functions of the packet network domain and control functions of the optical domain;
a logical interface coupled to the optical NOC, wherein the logical interface is configured to act as a proxy in the optical domain for the WDM optical interface of the packet network device by interfacing signals across the packet network-optical boundary from the optical domain into the packet network domain and to translate a request from the optical NOC comprising configuration parameters in order to configure the WDM optical interface of the packet network device via the optical domain; and
a communication path configured to exchange signals between the packet network device and the optical NOC in order to provision the WDM optical interface for communication with the second interface according to the configuration parameters.

2. The apparatus of claim 1, wherein the apparatus is further configured to acquire errors from the packet network device over the communication path arising from receiving and transmitting optical signals at the WDM optical interface and to transfer the errors to the optical NOC via the logical interface.

3. The apparatus of claim 1, wherein the communication path is configured to support a protocol selected from the group comprising eXtensible Markup Language (XML), Command Line Interface (CLI), Transaction Language One (TL-1), Link Management Protocol (LMP), and Simple Network Management Protocol (SNMP).

4. The apparatus of claim 1, wherein the apparatus is configured to negotiate which configuration parameters are accepted by the packet network device in order to configure the packet network device or the WDM optical interface.

5. The apparatus of claim 1, wherein the second interface is configured to be automatically mapped to the WDM interface on the router.

6. The apparatus of claim 1, wherein the logical interface is further configured to retrieve performance data from the IP network device and transfer the performance data to the optical NOC.

7. The apparatus of claim 1, wherein the communication path comprises an out of band communication channel.

8. The apparatus of claim 1, wherein the logical interface is further configured to translate negotiation requests transmitted from the optical NOC to the packet network device from an optical network protocol to a packet network protocol, and the second interface is configured to translate responses to the requests from the packet network device transmitted from the packet network to the optical network from a packet network protocol to an optical network protocol.

9. A method for managing the optical domain in a network having a packet network domain and an optical domain, the method comprising:
sending a command from an optical network operation center (NOC) via an optical control plane to a logical interface associated with an optical network device that is in the optical domain and is optically coupled to the optical NOC, wherein the logical interface is configured to act as a proxy in the optical domain for a first Wavelength Division Multiplexing (WDM) optical interface associated with a packet network device in the packet network domain by interfacing signals across a packet network-optical network boundary from the optical domain into the packet network domain, wherein the packet network device is coupled to a packet network NOC and normally managed by the packet network NOC via a packet network control plane, and wherein the packet network-optical network boundary separates control plane functions of the packet network domain and the optical domain;
translating the command into a provisioning message in order to provision the first WDM optical interface;

negotiating a configuration of the first WDM optical interface associated with the packet network device in the packet network domain from the optical NOC; and accepting changes to the provisioning of the first WDM optical interface in the packet network domain.

10. The method of claim 9, further comprising retrieving optical management data from the packet network device.

11. The method of claim 9, wherein sending comprises sending the command using a protocol selected from the group comprising eXtensible Markup Language (XML), Command Line Interface (CLI), Transaction Language One, an extension of the Link Management Protocol, and Simple Network Management Protocol (SNMP).

12. The method of claim 9, further comprising negotiating changes to provisioning of the packet network device.

13. The method of claim 9, wherein negotiating the configuration of the optical interface occurs automatically and further comprises determining which parameters of the optical interface for which the optical network device has permission to configure and then provisioning the optical interface accordingly.

14. The method of claim 9, further comprising automatically discovering a mapping between the first optical interface and a second optical interface associated with the optical network device by turning on and off a laser associated with the first optical interface to form a code detectable by the second optical interface and reportable to the optical NOC.

15. A system comprising the apparatus of claim 1, further comprising the packet network device, wherein the packet network device is configured to receive configuration parameters via the communication path.

16. The system of claim 15, wherein the packet network device is one of a Provider Bridge Transport device, an Ethernet switch, and a router.

17. In a packet-optical network having a packet network domain and an optical domain, a system for managing a device in the packet network domain from the optical domain, the system comprising:

an optical networking element (ONE) in the optical domain configured to be coupled to and controlled via an optical control plane;

an optical network operations center (NOC) in the optical domain and coupled to the ONE via the optical control plane;

a network edge device coupled to a packet network NOC via a packet network control plane in the packet network domain and having a Dense Wavelength Division Multiplexing (DWDM) interface coupled to the ONE, wherein the network edge device is normally managed by the packet network NOC via the packet network control plane and is configured to convert packet network traffic destined for the optical domain to optical traffic, and to convert optical traffic destined for the packet network domain to packet network traffic via optical signals that cross an packet-optical boundary that separates control plane functions of the IP domain and the optical domain, and wherein the network edge device comprises a device selected from the group comprising a router, an Ethernet switch, and a Provider Bridge Transport device;

a virtual transponder associated with the ONE comprising a logical interface and a protocol layer, wherein the logical interface acts as a proxy in the optical domain for the DWDM optical interface of the network edge device by interfacing signals across the packet-optical boundary from the optical domain into the packet network domain, wherein the ONE is configured to translate requests generated by the optical NOC in order to indirectly control the DWDM interface via the optical domain; and a communication path between the ONE and the network edge device, wherein requests are transmitted over the communication path using a signaling protocol.

18. The system of claim 17, wherein the ONE is configured to negotiate parameters associated with the DWDM optical interface, wherein the parameters comprise one or more of signal type, signal format, wavelength, alarm thresholds, and trace identifiers.

19. The system of claim 17, further comprising a laser associated with the DWDM interface, and wherein a mapping between an optical interface associated with the ONE and the DWDM interface is determined via an automatic discovery process by turning the laser on and off to form a code that causes the optical NOC to begin normal operations between the ONE and the network edge device.

20. The apparatus of claim 17, wherein the communication path is configured to support the signaling protocol selected from the group comprising Link Management Protocol, eXtensible Markup Language, Command Line Interface (CLI), Transaction Language One, and Simple Network Management Protocol.

* * * * *